(12) United States Patent
Shwartz et al.

(10) Patent No.: US 11,402,342 B2
(45) Date of Patent: Aug. 2, 2022

(54) SYSTEM AND METHOD FOR HIGH-RESOLUTION HIGH CONTRAST X-RAY GHOST DIFFRACTION

(71) Applicant: BAR-ILAN UNIVERSITY, Ramat Gan (IL)

(72) Inventors: Sharon Shwartz, Kiryat Ono (IL); Aviad Schori, Palo Alto, CA (US)

(73) Assignee: BAR-ILAN UNIVERSITY, Ramat Gan (IL)

( * ) Notice: Subject to any disclaimer, the term of this patent is extended or adjusted under 35 U.S.C. 154(b) by 0 days.

(21) Appl. No.: 16/968,769

(22) PCT Filed: Feb. 10, 2019

(86) PCT No.: PCT/IL2019/050159
§ 371 (c)(1),
(2) Date: Aug. 10, 2020

(87) PCT Pub. No.: WO2019/162934
PCT Pub. Date: Aug. 29, 2019

(65) Prior Publication Data
US 2021/0010955 A1    Jan. 14, 2021

Related U.S. Application Data

(60) Provisional application No. 62/633,108, filed on Feb. 21, 2018.

(51) Int. Cl.
*G01N 23/207* (2018.01)
*G01N 23/20008* (2018.01)
(Continued)

(52) U.S. Cl.
CPC ..... *G01N 23/207* (2013.01); *G01N 23/20008* (2013.01); *G01N 23/041* (2018.02);
(Continued)

(58) Field of Classification Search
None
See application file for complete search history.

(56) References Cited

U.S. PATENT DOCUMENTS 7,847,234 B2 * 12/2010 Meyers ............... H04L 9/0858
250/225
2009/0194702 A1   8/2009 Meyers et al.
2021/0010955 A1 * 1/2021 Shwartz ............... G01N 23/20

FOREIGN PATENT DOCUMENTS

CN         108827988 A  * 11/2018

OTHER PUBLICATIONS

Shih, Yanhua. "Quantum Imaging", published on arXiv Jul. 2, 2007 (Year: 2007).*
(Continued)

*Primary Examiner* — Thomas R Artman
(74) *Attorney, Agent, or Firm* — Roach, Brown, McCarthy & Gruber, P.C.; Kevin D. McCarthy

(57) ABSTRACT

A system for high-resolution high-contrast x-ray ghost diffraction comprises: A) a laboratory x-ray source configured to provide an input beam; B) a diffuser configured to induce intensity fluctuations in the input beam; C) a beam splitter configured to split the input beam into: i) a test arm comprising an object and a single-pixel detector; and ii) a reference arm comprising one of: (a) a multi-pixel detector and (b) a single-pixel detector and an aperture or a scanning slit configured to simulate a one or two dimensional multi-pixel detector; and D) a processor configured to receive output intensity measurements of the detectors in the test arm and the reference arm, to record the output intensity measurements at different rotational positions of the rotating diffuser, to correlate the output intensity measurements, and to use the correlated output measurements to reconstruct a diffraction pattern of the object; wherein the object is placed (Continued)

as close as possible to the beam splitter and the detectors in the test arm and the reference arm are equidistant from the beam splitter.

6 Claims, 5 Drawing Sheets

(51) Int. Cl.
    *G01N 23/041*    (2018.01)
    *G21K 7/00*    (2006.01)
    *G01N 23/2055*    (2018.01)

(52) U.S. Cl.
    CPC ... *G01N 23/2055* (2013.01); *G01N 2223/056* (2013.01); *G01N 2223/1016* (2013.01); *G01N 2223/302* (2013.01); *G01N 2223/304* (2013.01); *G01N 2223/313* (2013.01); *G01N 2223/503* (2013.01); *G21K 7/00* (2013.01); *G21K 2207/005* (2013.01)

(56) References Cited

OTHER PUBLICATIONS

Pelliccia, et al. "Practical X-ray Ghost Imaging with Synchrotron Light", published on arXiv Sep. 15, 2017 (Year: 2017).*
International Search Report for PCT/IL2019/050159, dated May 16, 2019, 5 pages.
Written Opinion of the International Searching Authority for PCT/IL2019/050159, dated May 16, 2019, 5 pages.
Lensless Fourier-Transform Ghost Imaging with Classical Incoherent Light, Zhang et al., Phys. Rev. A. 75(2), Feb. 20, 2007 (14 pages).
X-ray ghost imaging with a laboratory source, Schori et al., Optics Express, vol. 5(13), Jun. 26, 2017 (7 pages).
Incoherent coincidence imaging and its applicability in X-ray diffraction, Cheng et al., Phys. Rev. Lett. 92(9), Mar. 4, 2004 (4 pages).
Fourier-transform Ghost Imaging with Hard X-rays, Yu et al., Phys. Rev. Lett. 117, 118901, Sep. 9, 2016 (9 pages).

* cited by examiner

SYSTEM AND METHOD FOR HIGH-RESOLUTION HIGH CONTRAST X-RAY GHOST DIFFRACTION

FIELD OF THE INVENTION

The invention is from the field of imaging. Specifically the invention is from the field of ghost diffraction. More specifically the invention is from the field of ghost diffraction in the x-ray spectral range.

BACKGROUND OF THE INVENTION

X-ray imaging techniques are widely used in fields ranging from basic science and high-tech industry to medicine and homeland security. The main advantages of using x-rays for imaging are the extremely high spatial resolution (approximately 4 orders of magnitude greater than visible light), the strong dependence on atomic species and densities, and the long penetration depth.

Despite the existence of many instruments and devices, which are used to perform various x-ray imaging techniques, there are several physical limitations that restrict the resolution and contrast of the state of the art techniques. The main fundamental challenge in x-ray imaging is the absence of high quality lenses with adequate aperture. It is therefore desired to develop x-ray imaging techniques that do not require lenses and provide high quality images with high resolution and high contrast. Indeed, numerous techniques and approaches for lens-less imaging have been demonstrated with some degree of success, but none of them has become an ultimate method for imaging.

At the present, all commercially available techniques, including tomography, rely on the ability to detect the absorption differences between different portions of the inspected objects. There is either no magnification or very limited magnification, thus the resolution is limited to the pixel size, which is on the order of 0.01 mm. Needless to say, these systems cannot detect refractive index differences, although in many cases this ability would enhance the contrast and the clarity of the image. It should be noted that several lens-less imaging techniques have been proven to be very successful in imaging of Nano-scale sized objects. However, those techniques require high coherence and therefore are suitable only to large x-ray facilities such as synchrotrons and free-electron lasers.

Ghost imaging and ghost diffraction are imaging methods that have been developed by scientists working in the field of quantum optics. The methods have been widely investigated with visible light. In many schemes the methods do not require lenses and lead, in some cases, to image quality and resolution comparable to or even better than images obtained by conventional methods. However, it is clear that in the visible regime the impact of those methods is rather limited because of the existence of lenses and highly coherent sources (lasers).

In essence, ghost imaging and ghost diffraction methods utilize the correlation between two spatially separated beams to retrieve information about the investigated object. First, intensity fluctuations are added to the beam. Then the beam is split to generate two beams with identical intensity fluctuations. One beam propagates through the object and is collected by a single-pixel detector, while the second beam is detected directly by a multi-pixel detector. The image is reconstructed from the intensity correlation measurements. In ghost imaging the image is reconstructed, while in ghost diffraction the diffraction pattern is reconstructed. The latter can be combined with phase retrieval algorithms to achieve Nano-scale resolution. Recently, these methods have been demonstrated using synchrotron radiation facilities, which are not tabletop sources.

In a previously published paper [A. Schori and S. Shwartz "X-ray ghost imaging with a laboratory source", Optics Express Vol. 25, 14822-14828 (2017)] authored by the inventors of the present invention is demonstrated a system for x-ray ghost imaging with a laboratory source.

It is a purpose of the present invention to extend the previous work by providing a system and method for high-resolution and high-contrast measurements of x-ray ghost diffraction with a laboratory source.

Further purposes and advantages of this invention will appear as the description proceeds.

SUMMARY OF THE INVENTION

In a first aspect the invention is a system for high-resolution high-contrast x-ray ghost diffraction. The system comprises:
A) a laboratory x-ray source configured to provide an input beam;
B) a diffuser configured to induce intensity fluctuations in the input beam;
C) a beam splitter configured to split the input beam into:
 i) a test arm comprising an object and a single-pixel detector; and
 ii) a reference arm comprising one of: (a) a multi-pixel detector and (b) a single-pixel detector and an aperture or a scanning slit configured to simulate a one or two dimensional multi-pixel detector; and
D) a processor configured to receive output intensity measurements of the detectors in the test arm and the reference arm, to record the output intensity measurements at different rotational positions of the rotating diffuser, to correlate the output intensity measurements, and to use the correlated output measurements to reconstruct a diffraction pattern of the object.

To obtain ghost diffraction measurements the object is placed as close as possible to the beam splitter and the detectors in the test arm and the reference arm are equidistant from the beam splitter.

In embodiments of the system the diffuser is comprised of a combination of Nano-particles an average size of 50 nm and ordinary copy paper. In embodiments of the system the Nano-particles can be $Fe_2O_3$ Nano-particles. In embodiments of the system the Nano-particles can have an average size of 50 nm.

In embodiments of the system the beam splitter comprises a Highly Ordered Pyrolytic Graphite (HOPG) in Bragg geometry.

In a second aspect the invention is a method of for high-resolution high-contrast x-ray ghost diffraction. The method comprises:
A) activating a laboratory x-ray source to provide an input beam;
B) positioning a diffuser after the x-ray source;
C) activating the diffuser, thereby inducing intensity fluctuations in the input beam;
D) positioning a beam splitter after the diffuser;
E) causing the input beam to pass through the beam splitter, thereby splitting the input beam into a test arm and a reference arm;
F) positioning an object in the test arm as close as possible to the beam splitter;

G) positioning a single-pixel detector in the test arm after the object;

H) positioning one of: (a) a multi-pixel detector and (b) a single-pixel detector and an aperture or scanning slit configured to simulate a one or two dimensional multi-pixel detector in the reference arm, wherein the detectors in the test arm and the reference arm are equidistant from the sample;

I) sending output intensity measurements of the detectors in the test arm and the reference arm to a processor;

J) recording in the processor the output intensity measurements at different rotational positions of the rotating diffuser;

K) correlating in the processor the output intensity measurements; and

L) using the correlated output measurements to reconstruct a diffraction pattern of the object.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

The present invention extends to ghost diffraction previously described high-resolution and high contrast measurements of ghost imaging at x-ray wavelengths by using a commercial x-ray tube as a source. The present invention opens the possibility for high resolution and high contrast x-ray ghost diffraction measurements using commercially available sources. The key idea is that although the sources are incoherent, the intensity fluctuations of the beam emerging from the source are much faster than the response time of the detector, thus the detector averages out these fluctuations and they do not affect the measurements. An important difference from visible radiation is the small diffraction angle, which is inversely proportional to the wavelength. This allows the use of an artificial diffuser to control the degree of coherence and the divergence of the beam. Herein the term 'diffuser' is used in a generic sense to denote any component or combination of components known in the art that is configured to provide a different ensemble of speckles in each image acquired by the detectors. Examples of diffusers are rotating diffusers and raster scanners.

Figure 1A:
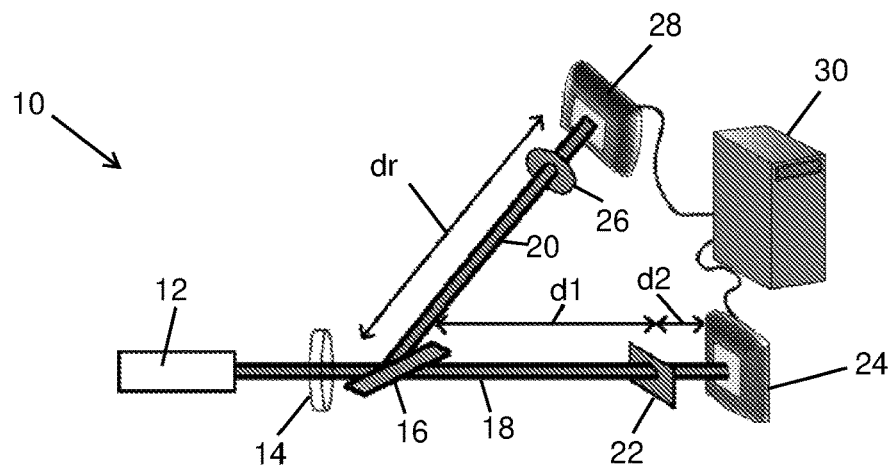
FIG. 1a schematically shows an embodiment of a system for ghost imaging measurements.
Figure 1B:
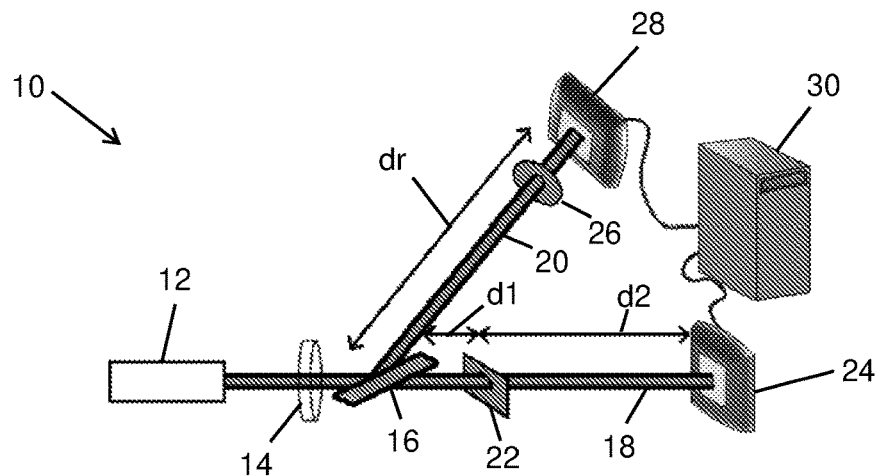
FIG. 1b schematically shows an embodiment of a system for ghost diffraction measurements.

The system of the invention is designed and constructed based on an x-ray diffraction system with a rotating anode source. An embodiment of a system 10 adapted for ghost imaging measurements is shown in FIG. 1a and an embodiment of system 10 adapted for ghost diffraction measurements is schematically shown in FIG. 1b. An input x-ray beam from a commercially available laboratory x-ray source 12 passes through a diffuser 14, which induces intensity fluctuations in the input beam, and is split by a beam splitter 16, which in this embodiment is implemented by using a Highly Ordered Pyrolytic Graphite (HOPG) in Bragg geometry. One beam propagates in the test arm 18 and the other in the reference arm 20. The beam propagating in the test arm 18 passes through an object 22 and is collected by a test detector 24. The beam propagating in the reference arm 20 does not interact with the object 22 and after passing through scanning slit 26 is collected by a reference detector 28. The output measurements of the detectors 24 and 28 are sent to a processor unit 30 and for a rotary diffuser, recorded at different rotational positions of the diffuser (realizations). The processor correlates these intensity measurements and uses the correlated measurements to reconstruct the diffraction pattern of the object.

The difference between FIG. 1a and FIG. 1b is that for ghost imaging measurements the object 22 is placed as close as possible to the test detector 24 and in ghost diffraction measurements the object 22 is placed as close as possible to the beam splitter 16. In both systems 10 the detectors are equidistant from the beam splitter, i.e. $d_r=d_1+d_2$. In the embodiments shown in FIGS. 1a and 1b, the test detector 24 is a single-pixel detector and the reference detector 28 is also single-pixel detector that is used in combination with either a scanning slit or an aperture 26 to simulate a multi-pixel detector in one or two dimensions. Both detectors have a dark count of about one count per minute. In other embodiments the reference detector 28 is a multi-pixel camera (without the scanning slit).

Figure 1C:
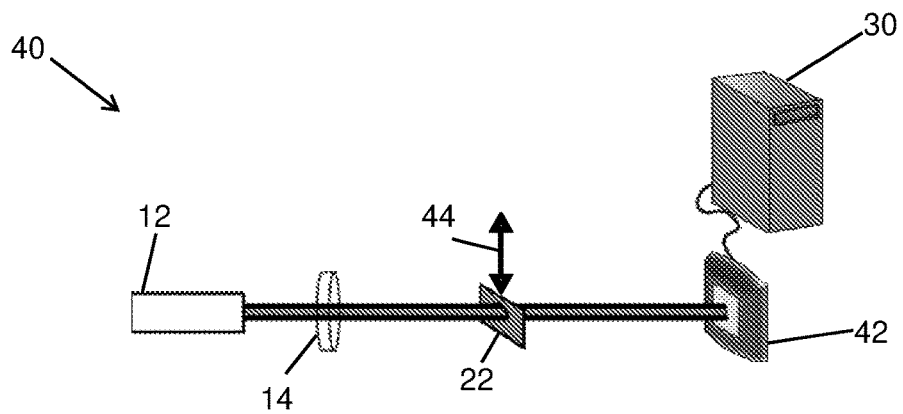
FIG. 1c schematically shows an embodiment of a system that can be used for performing both ghost diffraction and ghost imaging measurements.

FIG. 1c schematically shows an embodiment of a system that can be used for performing both ghost diffraction and ghost imaging measurements, wherein the object is close to the detector for ghost imaging and far from the detector for ghost diffraction. Unlike system 10 of FIGS. 1a and 1b, the system 40 does not comprise a beam splitter and therefore comprises only one arm that alternately functions as a test arm in which a beam from x-ray source 12 passing through a diffuser 14 and then passes through sample 22 and is detected by a multi-pixel detector 42, which is operated as a bucket detector. The system 40 functions as a reference arm by means of a mechanism that is symbolically represented by a double headed arrow 44 that moves the object 22 out of the x-ray beam (and back into the beam to reestablish the test arm) and operating the detector 42 as a true multi-pixel detector.

Figure 2A:
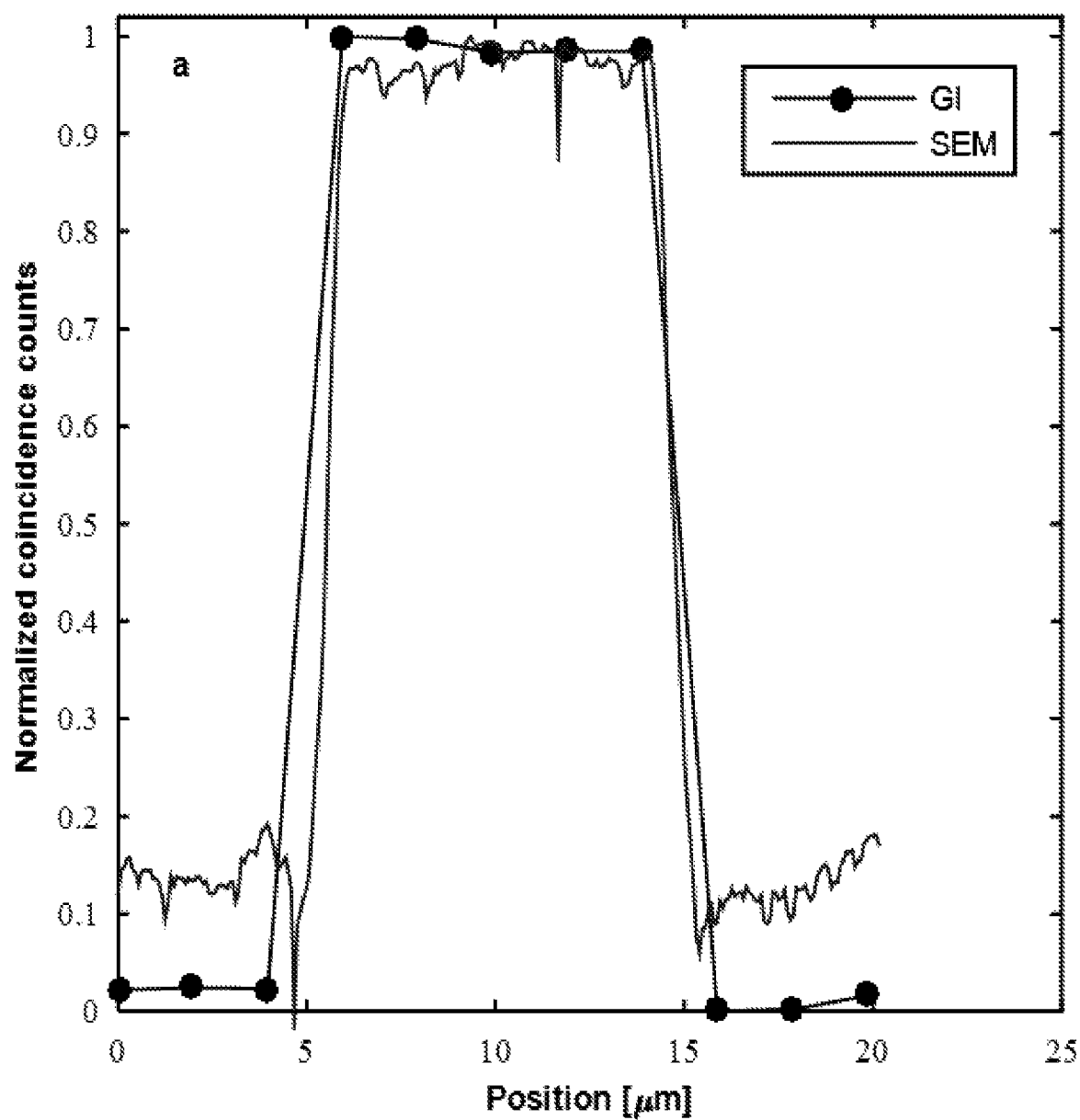
FIGS. 2a and 2b respectively show experimental results for ghost imaging measurements of a 10 μm slit and a 100 μm slit.
Figure 2B:
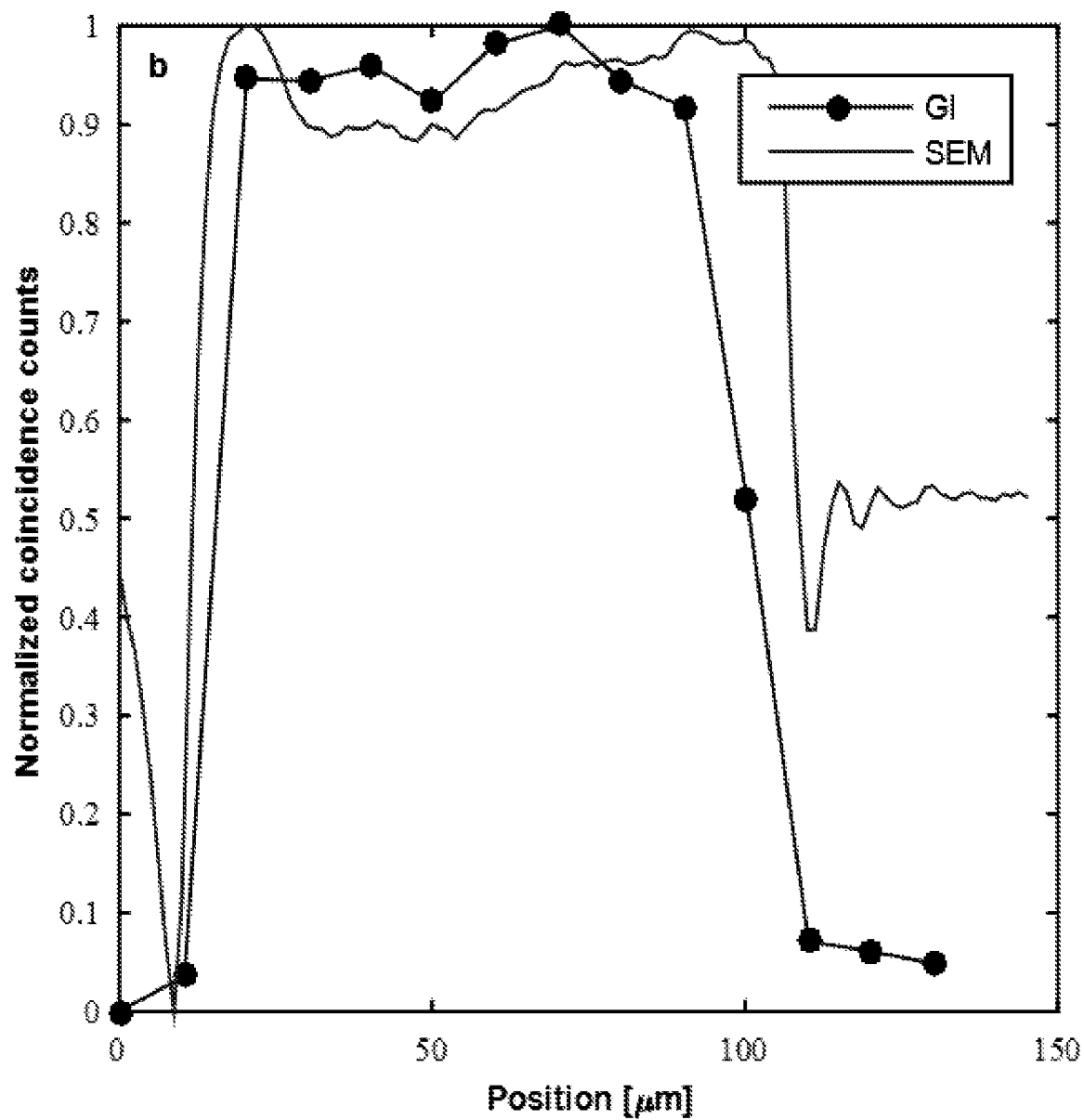

Experimental results of ghost imaging and scanning electron microscope (SEM) measurements for a 10 μm slit and a 100 μm slit are shown in FIG. 2a and FIG. 2b, respectively. The scanning resolutions are 2 and 10 μm, respectively. The diffuser was made from a copy paper. The respective measured widths of the slits in FIG. 1a and FIG. 1b are 10±0.732 μm and 100±1.25 μm respectively. The contrast between of the edges of the slits and the slit centres is practically ideal, unlike the SEM measurements.

Figure 3A:
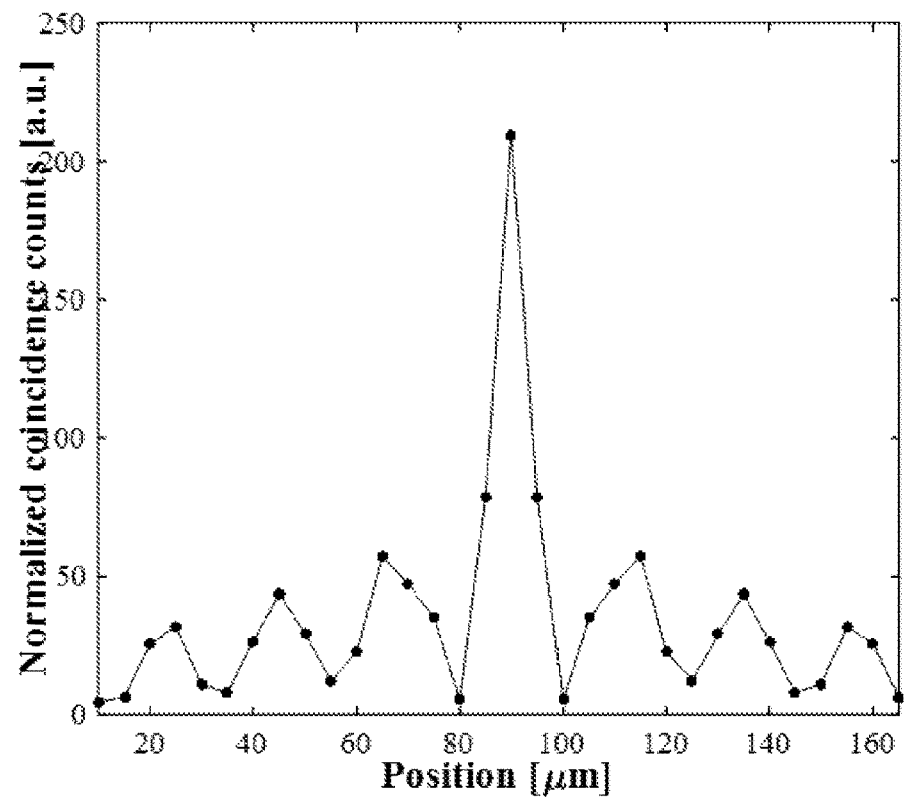
FIG. 3a shows experimental results for ghost diffraction measurements of a 2 μm slit.

Experimental results for ghost diffraction measurements for a 2 μm slit are shown in FIG. 3a. The measurements were performed by scanning over the vertical position of a slit 26 positioned in front of the reference detector 28 and measuring the coincidence count rate and the individual count rate of each of the detectors 24,28. The diffuser 14 was made from a combination of $Fe_2O_3$ Nano-particles with an average size of 50 nm and ordinary copy paper.

Figure 3B:
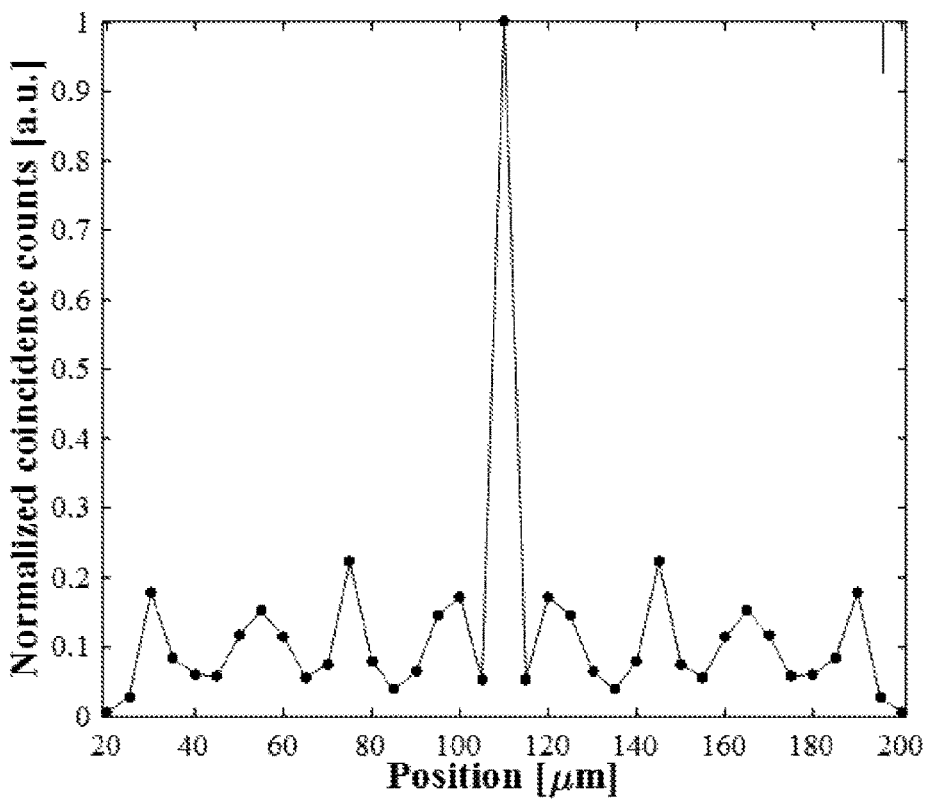
FIG. 3b shows experimental results for ghost diffraction measurements of a 0.8 μm Si micro-pores array.
Figure 4:
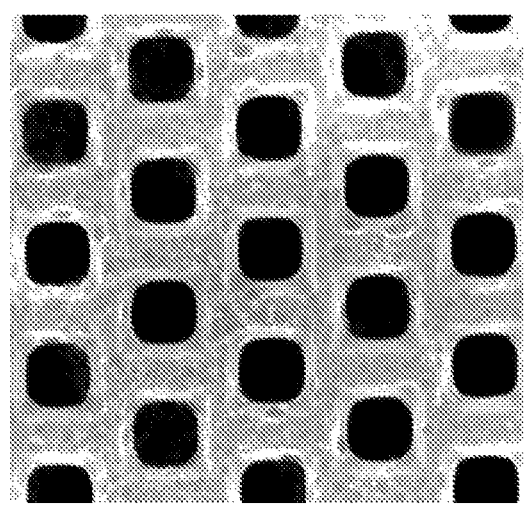
FIG. 4 is a SEM image of the Si micro-pores array of FIG. 3b.

Experimental results for ghost diffraction measurements for a 0.8 µm silicon micro-pores array with a 20 µm fixed slit (26) are shown is FIG. 3b. A SEM image of the micro-pores array is shown in FIG. 4. The average pore diameter is 0.8 µm and the average inter-pore distance is 1.5 µm. The measurements were made under the same conditions as the measurements for the 2 µm slit.

Referring to FIG. 1b, the 2 µm slit and the 0.8 µm Si micro-pores array objects 22 were positioned at a distance $d_2$ of ~400 mm from the test detector 24. The x-ray source used to make the ghost diffraction measurements shown in FIGS. 3a and 3b was a SmartLab (9 kW) x-ray diffraction system Manufactured by the Rigaku Corporation.

To the best of the inventor's knowledge this is the first time that ghost diffraction at x-ray wavelengths been demonstrated using a laboratory x-ray source—as opposed to a large electron accelerator. This invention opens the possibility for high resolution and high contrast ghost diffraction at x-ray wavelengths. The technique developed by the inventors using the system described herein has the potential to evolve into new powerful imaging devices with new capabilities and enhanced performances for fields such as medical imaging, security screening, electronic and Nanoscale device industries, and basic science.

Although embodiments of the invention have been described by way of illustration, it will be understood that the invention may be carried out with many variations, modifications, and adaptations, without exceeding the scope of the claims.

The invention claimed is:

1. A system for high-resolution high-contrast x-ray ghost diffraction, the system comprising:
   A) an incoherent tabletop x-ray source configured to provide an input beam;
   B) a diffuser configured to induce intensity fluctuations in the input beam;
   C) a beam splitter configured to split the input beam into:
      i) a test arm comprising an object and a single-pixel detector; and
      ii) a reference arm comprising one of:
         (a) a multi-pixel detector and
         (b) a single-pixel detector and an aperture or a scanning slit configured to simulate a one or two dimensional multi-pixel detector; and
   D) a processor configured to receive output intensity measurements of the detectors in the test arm and the reference arm, to record the output intensity measurements at different rotational positions of the rotating diffuser, to correlate the output intensity measurements, and to use the correlated output measurements to reconstruct a diffraction pattern of the object;
   wherein the object is placed as close as possible to the beam splitter and the detectors in the test arm and the reference arm are equidistant from the beam splitter.

2. The system of claim 1, wherein the diffuser is comprised of a combination of Nano-particles that have an average size of 50 nm and ordinary copy paper.

3. The system of claim 2, wherein the Nano-particles are $Fe_2O_3$ Nano-particles.

4. The system of claim 1, wherein the beam splitter comprises a Highly Ordered Pyrolytic Graphite (HOPG) in Bragg geometry.

5. A method of for high-resolution high-contrast x-ray ghost diffraction, the method comprising:
   A) activating an incoherent tabletop x-ray source to provide an input beam;
   B) positioning a diffuser after the x-ray source;
   C) rotating the diffuser, thereby inducing intensity fluctuations in the input beam;
   D) positioning a beam splitter after the diffuser;
   E) causing the input beam to pass through the beam splitter, thereby splitting the input beam into a test arm and a reference arm;
   F) positioning an object in the test arm as close as possible to the beam splitter;
   G) positioning a single-pixel detector in the test arm after the object;
   H) positioning one of:
      (a) a multi-pixel detector and
      (b) a single-pixel detector and an aperture or a scanning slit configured to simulate a one or two dimensional multi-pixel detector in the reference arm, wherein the detectors in the test arm and the reference arm are equidistant from the sample;
   I) sending output intensity measurements of the detectors in the test arm and the reference arm to a processor;
   J) recording in the processor the output intensity measurements at different rotational positions of the rotating diffuser;
   K) correlating in the processor the output intensity measurements; and
   L) using the correlated output measurements to reconstruct a diffraction pattern of the object.

6. A system for high-resolution high-contrast x-ray ghost diffraction, the system comprising:
   A) an incoherent tabletop x-ray source configured to provide an input beam;
   B) a diffuser configured to induce intensity fluctuations in the input beam;
   C) a beam splitter configured to split the input beam into:
      i) a test arm comprising an object and a single-pixel detector; and
      ii) a reference arm comprising one of:
         (a) a multi-pixel detector and
         (b) a single-pixel detector and an aperture or a scanning slit configured to simulate a one or two dimensional multi-pixel detector; and
   D) a processor configured to receive output intensity measurements of the detectors in the test arm and the reference arm, to record the output intensity measurements at different rotational positions of the rotating diffuser, to correlate the output intensity measurements, and to use the correlated output measurements to reconstruct a diffraction pattern of the object;
   wherein the object is placed proximate to the beam splitter and distal to the single-pixel detector along the test arm and the detectors in the test arm and the reference arm are equidistant from the beam splitter.

* * * * *